United States Patent
Wen et al.

(10) Patent No.: US 10,320,457 B2
(45) Date of Patent: Jun. 11, 2019

(54) BEAM TRACKING METHOD, APPARATUS, AND SYSTEM

(71) Applicant: Huawei Technologies Co., Ltd., Shenzhen (CN)

(72) Inventors: Rong Wen, Chengdu (CN); Kunpeng Liu, Chengdu (CN); Jiguang He, Hong Kong (CN); Taejoon Kim, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 15/467,813

(22) Filed: Mar. 23, 2017

(65) Prior Publication Data

US 2017/0195022 A1 Jul. 6, 2017

Related U.S. Application Data

(63) Continuation of application No. PCT/CN2014/087207, filed on Sep. 23, 2014.

(51) Int. Cl.
*H04B 7/06* (2006.01)
*H04L 1/06* (2006.01)
(Continued)

(52) U.S. Cl.
CPC ......... *H04B 7/0456* (2013.01); *H04B 7/0478* (2013.01); *H04B 7/0482* (2013.01);
(Continued)

(58) Field of Classification Search
CPC .. H04B 7/0456; H04B 7/0478; H04B 7/0482; H04B 7/0617; H04B 7/0619;
(Continued)

(56) References Cited

U.S. PATENT DOCUMENTS

| 9,392,607 | B2 * | 7/2016 | Huang | ................. H04B 7/0452 |
| 2005/0094741 | A1 | 5/2005 | Kuroda | |
| 2013/0301454 | A1 * | 11/2013 | Seol | ....................... H04B 7/043 370/252 |

FOREIGN PATENT DOCUMENTS

| CN | 101621357 A | 1/2010 |
| CN | 101795181 A | 8/2010 |
| EP | 2498412 A1 | 12/2012 |

OTHER PUBLICATIONS

Kim et al., "MIMO Systems with Limited Rate Differential Feedback in Slowly Varying Channels," in IEEE Transactions on Communications, vol. 59, No. 4, pp. 1175-1189, Apr. 2011.*

* cited by examiner

*Primary Examiner* — Michelle M Koeth
(74) *Attorney, Agent, or Firm* — Leydig, Voit & Mayer, Ltd.

(57) ABSTRACT

Embodiments of the present application provide a beam tracking method, apparatus, and system, which relate to the communications field, so that a relatively high channel capacity can be obtained, and system spectrum efficiency can be improved. The method includes: obtaining, by a communications device, a channel relevance coefficient, and determining a first radio-frequency weighted matrix of the communications device in an $(n+1)^{th}$ timeslot according to the relevance coefficient, where n is an integer, and $n \geq 1$; receiving, by the communications device, a first known signal sent by a peer device, and determining an equivalent channel matrix in the $(n+1)^{th}$ timeslot according to the received first known signal; and determining, by the communications device, a digital weighted matrix of the communications device in the $(n+1)^{th}$ timeslot according to the equivalent channel matrix, so as to match a real-time channel and transmit data by using the real-time channel.

10 Claims, 8 Drawing Sheets

(51) Int. Cl.
    *H04L 25/02*         (2006.01)
    *H04W 72/04*        (2009.01)
    *H04B 7/0456*       (2017.01)

(52) U.S. Cl.
    CPC ......... *H04B 7/0617* (2013.01); *H04B 7/0619* (2013.01); *H04L 1/06* (2013.01); *H04L 25/022* (2013.01); *H04L 25/0224* (2013.01); *H04W 72/0446* (2013.01)

(58) Field of Classification Search
    CPC ..... H04L 25/022; H04L 25/0224; H04L 1/06; H04W 72/0446
    See application file for complete search history.

BEAM TRACKING METHOD, APPARATUS, AND SYSTEM

CROSS-REFERENCE TO RELATED APPLICATIONS

This Application is a continuation of International Application No. PCT/CN2014/087207, filed on Sep. 23, 2014, the disclosure of which is hereby incorporated by reference in its entirety.

TECHNICAL FIELD

The present application relates to the communications field, and in particular, to a beam tracking method, apparatus, and system.

BACKGROUND

To further improve a capacity and spectrum efficiency of a wireless communications system, so as to meet a user's requirement for a wireless access capacity, a wireless communications access system further develops towards a dense network structure, broader bandwidth, and higher spatial multiplexing, so that a future high-speed wireless access requirement can be met. A microwave band or millimeter-wave frequency band has abundant spectrum resources and attracts increasing attention from communications device manufacturers. However, space loss is large. Therefore, a large-scale antenna array is used to reduce the space loss and improve a system capacity and frequency spectrum efficiency. In a microwave or millimeter-wave wireless communications system that has large-scale antennas, a hybrid beamforming system of digital precoding and analog weighting is also used, so as to reach an optimal compromise between performance and system complexity.

Currently, for the hybrid beamforming system, commonly used beam tracking methods are mainly a scanning method and a real-time calculation method. In the scanning method, scanning is mainly performed by changing a weighted value of a phase shifter to change a beam direction, and a receive end selects an optimal communication beam according to a maximum receive power criterion. In the real-time calculation method, channel decomposition and matching are mainly performed according to a channel estimated in real time, and a weighted matrix of a radio-frequency end and a weighted matrix of a digital end are jointly calculated.

In existing beam tracking methods, the scanning method is relatively simple and is applicable to a LOS (line-of-sight) propagation scenario, and the method can have approximately optimal performance in the LOS propagation scenario. However, the scanning method is inapplicable to an NLOS (non-line-of-sight) propagation scenario. The real-time calculation method is applicable to the NLOS propagation scenario and the LOS propagation scenario, and the real-time calculation method has optimal performance in the NLOS propagation scenario. However, because there are a relatively large quantity of antennas in a high-frequency large-scale antenna system, if a channel is estimated in the real-time calculation method by using a conventional pilot-based solution, a large quantity of timeslots need to be occupied to send a training sequence. In addition, because a dimension of a channel matrix in the high-frequency system is large, many resources need to be occupied to feed back channel information, and consequently, the method is difficult to implement.

SUMMARY

Embodiments of the present application provide a beam tracking method, apparatus, and system, so that a relatively high channel capacity can be obtained, and system spectrum efficiency can be improved.

To achieve the foregoing objective, the following technical solutions are used in the embodiments of the present application:

According to a first aspect, an embodiment of the present application provides a beam tracking method, including:

obtaining, by a communications device, a channel relevance coefficient, and determining a first radio-frequency weighted matrix of the communications device in an $(n+1)^{th}$ timeslot according to the relevance coefficient, where n is an integer, and n≥1;

receiving, by the communications device, a first known signal sent by a peer device, and determining an equivalent channel matrix in the $(n+1)^{th}$ timeslot according to the received first known signal, where the first known signal is sent by the peer device to the communications device according to a second radio-frequency weighted matrix of the peer device in the $(n+1)^{th}$ timeslot and the first radio-frequency weighted matrix of the communications device in the $(n+1)^{th}$ timeslot; and determining, by the communications device, a digital weighted matrix of the communications device in the $(n+1)^{th}$ timeslot according to the equivalent channel matrix, so as to match a real-time channel and transmit data by using the real-time channel.

According to a second aspect, an embodiment of the present application provides a communications device, including:

an obtaining unit, configured to: obtain a channel relevance coefficient; and receive a first known signal sent by a peer device, where the first known signal is sent by the peer device according to a second radio-frequency weighted matrix of the peer device in an $(n+1)^{th}$ timeslot and a first radio-frequency weighted matrix of the communications device in the $(n+1)^{th}$ timeslot; and a determining unit, configured to: determine the first radio-frequency weighted matrix of the communications device in the $(n+1)^{th}$ timeslot according to the relevance coefficient obtained by the obtaining unit, where n is an integer, and n≥1; determine an equivalent channel matrix in the $(n+1)^{th}$ timeslot according to the first known signal received by the obtaining unit; and determine a digital weighted matrix of the communications device in the $(n+1)^{th}$ timeslot according to the equivalent channel matrix, so as to match a real-time channel and transmit data by using the real-time channel.

According to a third aspect, an embodiment of the present application provides a communications device, including:

a communications interface, configured to: obtain a channel relevance coefficient; and receive a first known signal sent by a peer device, where the first known signal is sent by the peer device according to a second radio-frequency weighted matrix of the peer device in an $(n+1)^{th}$ timeslot and a first radio-frequency weighted matrix of the communications device in the $(n+1)^{th}$ timeslot; and a processor, configured to: determine the first radio-frequency weighted matrix of the communications device in the $(n+1)^{th}$ timeslot according to the relevance coefficient obtained by the communications interface, where n is an integer, and n≥1; determine an equivalent channel matrix in the $(n+1)^{th}$ timeslot according to the first known signal received by the communications interface; and determine a digital weighted matrix of the communications device in the $(n+1)^{th}$ timeslot according to the equivalent channel matrix, so as to match a real-time channel and transmit data by using the real-time channel.

According to a fourth aspect, an embodiment of the present application provides a beam tracking system, including a base station and a terminal, where the base station communicates with the terminal by using a wireless system, and the base station or the terminal or both include the communications device that has any one of the foregoing features.

The embodiments of the present application provide a beam tracking method, apparatus, and system. A communications device obtains a channel relevance coefficient, and determines a first radio-frequency weighted matrix of the communications device in an $(n+1)^{th}$ timeslot according to the relevance coefficient. That is, the first radio-frequency weighted matrix of the communications device in the $(n+1)^{th}$ timeslot is a matrix determined by the communications device after the communications device considers relevance between channels. The first radio-frequency weighted matrix that is of the communications device in the $(n+1)^{th}$ timeslot and that is determined by using the method has relatively high accuracy. After the communications device determines the first radio-frequency weighted matrix of the communications device in the $(n+1)^{th}$ timeslot, the communications device determines an equivalent channel matrix in the $(n+1)^{th}$ timeslot by using a received first known signal, and then determines a digital weighted matrix of the communications device in the $(n+1)^{th}$ timeslot according to the equivalent channel matrix.

Because the first known signal received by the communications device is sent by a peer device to the communications device according to a second radio-frequency weighted matrix of the peer device in the $(n+1)^{th}$ timeslot and the first radio-frequency weighted matrix of the communications device in the $(n+1)^{th}$ timeslot, both the digital weighted matrix of the communications device in the $(n+1)^{th}$ timeslot and the radio-frequency weighted matrix of the communications device in the $(n+1)^{th}$ timeslot that are determined by the communications device can reflect channel real-time quality and match a real-time channel. In this case, when the communications device transmits data in a high-frequency large-scale antenna system according to the digital weighted matrix and the radio-frequency weighted matrix, a relatively high channel capacity can be obtained, and system spectrum efficiency can be improved.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
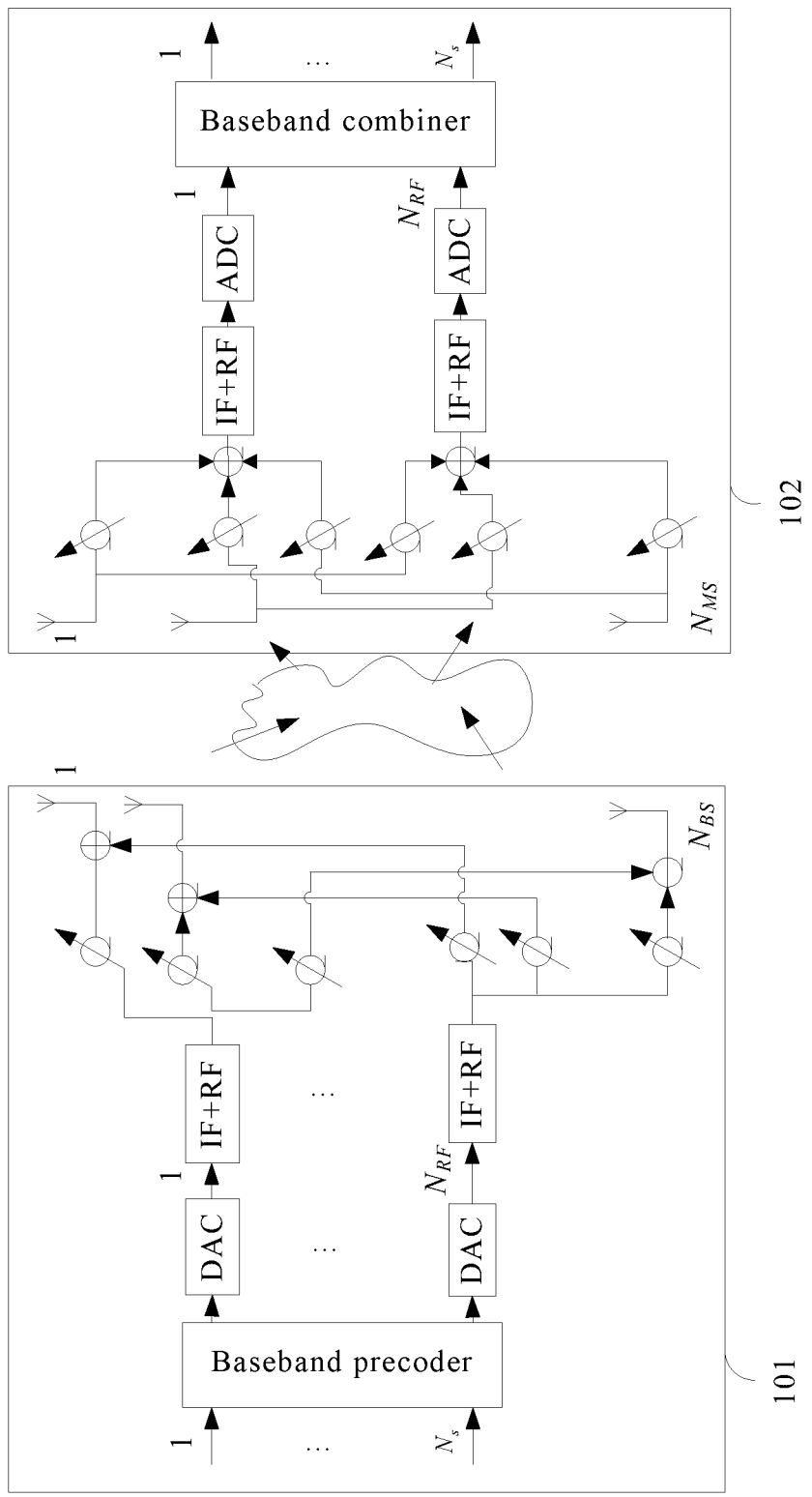
FIG. 1 is a schematic diagram of a system architecture of a hybrid beamforming system.

The following clearly describes the technical solutions in the embodiments of the present application with reference to the accompanying drawings in the embodiments of the present application. Apparently, the described embodiments are merely some but not all of the embodiments of the present application.

In the following description, specific details such as a particular system structure, an interface, and a technology are set forth in an illustrative but not a restrictive sense to make a thorough understanding of the present application. However, a person skilled in the art should know that the present application may be practiced in other embodiments without these specific details. In other cases, detailed descriptions of well-known apparatuses, circuits, and methods are omitted, so that the present application is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Mentioning "one embodiment", "an embodiment", "an example of an embodiment", "various embodiments", and the like indicates that described embodiments of the present application may include a specific characteristic, structure, or feature, instead of indicating that each embodiment must include the specific characteristic, structure, or feature. In addition, a phrase "in one embodiment" that is repeatedly used may not indicate that the embodiments are the same, although the phrase may indicate that the embodiments are the same.

For example, herein, unless otherwise specified, using ordinal adjectives "first", "second", "third", and the like to describe general objects only indicates that different instances of similar objects are quoted, but does not imply that the described objects must have a designated example.

A terminal may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (or referred to as a "cellular" phone) or a computer with a mobile terminal, or may be a portable, pocket-sized, handheld, computer built-in, or in-vehicle mobile apparatus that exchanges voice and/or data with the radio access network, for example, a personal communications service (PCS) phone, a cordless telephone set, a Session Initiation Protocol (SIP) phone set, a wireless local loop (WLL) station, or a personal digital assistant (PDA). The wireless terminal may be referred to as a system, a subscriber unit, a subscriber station, a mobile station, a remote station, an access point, a remote terminal, an access terminal, a user terminal, a user agent, user device, or user equipment.

In a beamforming technology, a multi-antenna array is used, and transmit signals of multiple antennas are weighted according to channel information, so that when reaching a receive end after passing through a radio channel, in-phase signals can be superposed and mutually enhanced as if the signals are aggregated into one beam. In the technology, a case in which the signals transmitted by the multiple transmit antennas are mutually cancelled when reaching the receive end is avoided, so as to improve a signal-to-noise ratio and obtain a multi-antenna array gain.

LOS means that a radio signal is "rectilinearly" propagated between a transmit end and a receive end without being blocked, and the LOS requires that no object that blocks a radio wave exists in a Fresnel region (a circular region encircling a line of sight). If the requirement is not met, signal strength significantly decreases.

NLOS means that a line of sight between a transmit end and a receive end is blocked, that is, if there is an obstacle (more than 50% of a Fresnel region is blocked), a radio signal can reach the receive end only by means of reflection, scattering, diffraction, and the like, and in this case, the radio signal is received in multiple manners.

Embodiments of the present application provide a beam tracking method, apparatus, and system, so as to mainly resolve a problem in an existing beam tracking method that a scanning solution is simple, but is inapplicable to an NLOS propagation scenario and a real-time calculation method has optimal performance in the NLOS propagation scenario, but is difficult to implement.

Various technologies described in the embodiments of the present application may be applied to access and tracking by a terminal in a high-frequency large-scale antenna system, or may be applied to beam tracking by a mobile user in a high-frequency large-scale antenna system. That is, the embodiments of the present application are applicable to a communication scenario of high-frequency uplink and high-frequency downlink, are also applicable to a communication scenario of high-frequency downlink and low-frequency uplink, and are applicable to the NLOS propagation scenario.

FIG. 1 describes a system architecture of a hybrid beamforming system to which the embodiments of the present application are applicable. As shown in FIG. 1, the system includes one or more base stations 101 and/or one or more terminals 102. The base station 101 includes a baseband precoder, $N_{RF}$ DACs (digital-to-analog converter), $N_{RF}$ IFs+RFs (intermediate frequency+radio frequency), multiple phase shifters, and $N_B$S transmit antennas. Correspondingly, the terminal 102 includes a baseband combiner, $N_{RF}$ ADCs (analog to digital converter), $N_{RF}$ IFs+RFs, multiple phase shifters, and $N_B$S receive antennas. Specifically, the base station 101 and the terminal 102 in the system architecture separately perform two-level weighting (digital weighting and radio-frequency weighting) on a transmit signal.

Embodiment 1

Figure 2:
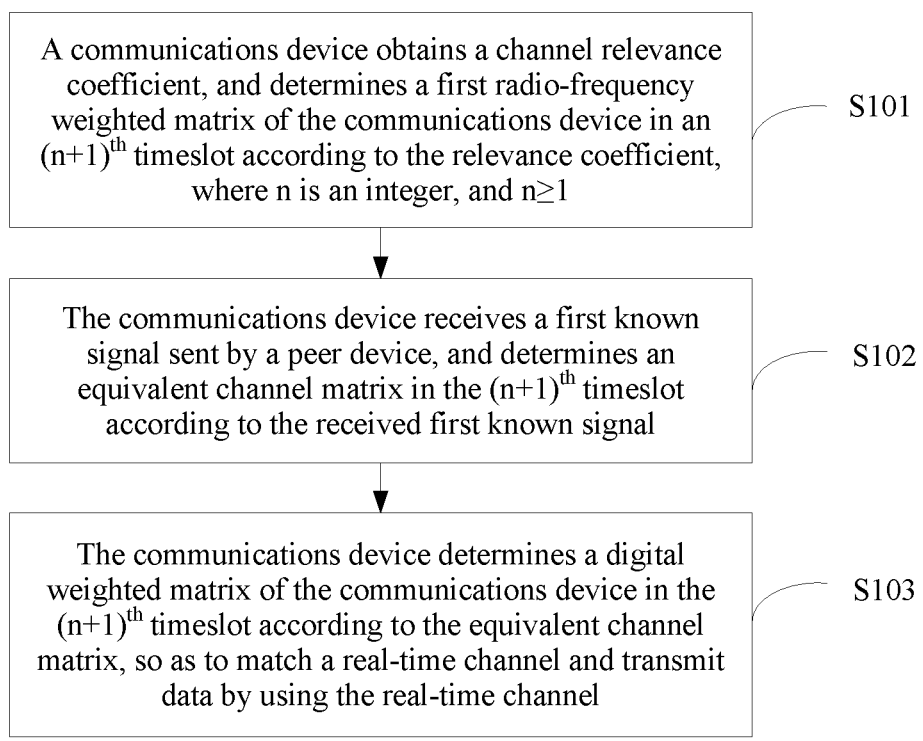
FIG. 2 is a schematic flowchart 1 of a beam tracking method according to an embodiment of the present application.

This embodiment of the present application provides a beam tracking method. As shown in FIG. 2, the method includes the following steps.

S101. A communications device obtains a channel relevance coefficient, and determines a first radio-frequency weighted matrix of the communications device in an $(n+1)^{th}$ timeslot according to the relevance coefficient, where n is an integer, and $n \geq 1$.

Optionally, in this embodiment of the present application, the communications device may be a base station, or may be a terminal, and this is not limited in this embodiment of the present application.

Specifically, because time relevance between real-time channels basically exists in any communications system, in this embodiment of the present application, the communications device needs to first obtain the channel relevance coefficient when determining a weighted matrix that matches the real-time channel.

In this embodiment of the present application, the communications device obtains the channel relevance coefficient in multiple manners, and this is not limited in this embodiment of the present application.

Specifically, if the communications device is a terminal, the channel relevance coefficient may be determined by the terminal according to factors such as an environment in which the terminal is, a moving speed, and a multipath delay, or may be determined by the terminal by means of channel estimation or by using a known signal. This is not limited in this embodiment of the present application. If the communications device is a base station, the channel relevance coefficient may be sent by a peer device to the base station, or may be determined by the base station according to a received channel relevance parameter that is sent by a peer device to the base station and that includes information about the peer device such as a geographic location, a moving speed, and a multipath delay. This is not limited in this embodiment of the present application.

The peer device is a device that is configured relative to the communications device.

For example, if the communications device is a base station, the peer device may be a terminal; or if the communications device is a terminal, the peer device may be a base station.

After the communications device obtains the channel relevance coefficient, the communications device may determine the first radio-frequency weighted matrix of the communications device in the $(n+1)^{th}$ (n>1) timeslot according to the relevance coefficient. The first radio-frequency weighted matrix is a radio-frequency weighted matrix of the communications device end.

Specifically, after obtaining the relevance coefficient, the communications device generates a basic codebook matrix set according to a criterion for minimizing maximum relevance between codebooks; then, the communications device determines an update codebook matrix set according to the obtained relevance coefficient and the generated basic codebook matrix set, so that the communications device updates weighting coefficients of all column vectors in a first radio-frequency weighted matrix of the communications device in an $n^{th}$ timeslot according to the update codebook matrix set, and obtains a candidate codebook matrix set of the first radio-frequency weighted matrix of the communications device in the $(n+1)^{th}$ timeslot; and finally, the communications device determines the first radio-frequency weighted matrix of the communications device in the $(n+1)^{th}$ timeslot from the candidate codebook matrix set according to a preset criterion.

The preset criterion in this embodiment of the present application may be a maximum receive power criterion, may be a minimum mean square error criterion, or may be a maximum signal-to-noise ratio criterion, and this is not limited in this embodiment of the present application.

Further, if the communications device is a terminal and the preset criterion is the maximum receive power criterion, after obtaining the candidate codebook matrix set of the first radio-frequency weighted matrix of the terminal in the $(n+1)^{th}$ timeslot, the terminal receives a second known signal sent by the base station, and calculates, according to the received second known signal, receive power that matches each candidate codebook matrix in the candidate codebook matrix set used by the terminal. In this case, the terminal may determine maximum receive power, and determine a candidate codebook matrix that matches the maximum receive power as the first radio-frequency weighted matrix of the terminal in the $(n+1)^{th}$ timeslot.

If the communications device is a base station and the preset criterion is the maximum receive power criterion, after obtaining the candidate codebook matrix set of the first radio-frequency weighted matrix of the base station in the $(n+1)^{th}$ timeslot, the base station sends a second known signal to the peer device, so that the peer device calculates, according to the second known signal, receive power of each candidate codebook matrix in the candidate codebook matrix set used by the base station, and determines a sequence number of a candidate codebook matrix that matches maximum receive power. In this case, the base station may receive the sequence number sent by the peer device, and determine the candidate codebook matrix that matches the sequence number as the first radio-frequency weighted matrix of the base station in the $(n+1)^{th}$ timeslot.

The second known signal in this embodiment of the present application is a preset signal, and a name of the second known signal is not limited in this embodiment of the present application. For example, the second known signal is a training signal.

Preferably, the second known signal is a training sequence.

S102. The communications device receives a first known signal sent by a peer device, and determines an equivalent channel matrix in the $(n+1)^{th}$ timeslot according to the received first known signal.

Specifically, after determining the first radio-frequency weighted matrix of the communications device in the $(n+1)^{th}$ timeslot according to the relevance coefficient, the communications device may receive the first known signal sent by the peer device, and determine the equivalent channel matrix in the $(n+1)^{th}$ timeslot according to the received first known signal. In this case, the first known signal received by the communications device is sent by the peer device to the communications device according to a second radio-frequency weighted matrix of the peer device in the $(n+1)^{th}$ timeslot and the first radio-frequency weighted matrix of the communications device in the $(n+1)^{th}$ timeslot.

The first known signal is a preset signal, the first known signal is a signal that is known to both the communications device and the peer device, and a name of the first known signal is not limited in this embodiment of the present application. For example, the first known signal is a sounding signal.

It may be understood that, the first known signal received by the communications device is a signal that passes through an adjusted channel between the communications device and the peer device, that is, a known signal sent by the peer device to the communications device according to the second radio-frequency weighted matrix in the $(n+1)^{th}$ timeslot and the first radio-frequency weighted matrix of the communications device in the $(n+1)^{th}$ timeslot, and the first known signal sent by the peer device is a signal that is known to both the communications device and the peer device. In this case, the communications device may determine the equivalent channel matrix in the $(n+1)^{th}$ timeslot by means of calculation according to the first known signal sent by the peer device.

In an actual application, the following formula may be used to specifically represent the equivalent channel matrix in the $(n+1)^{th}$ timeslot:

$$H_{\mathit{eff},n+1} = W_{RF,n+1} H_{n+1} F_{RF,n+1}, \text{ where}$$

$H_{\mathit{eff},n+1}$ represents the equivalent channel matrix between the communications device and the peer device in the $(n+1)^{th}$ timeslot, $W_{RF,n+1}$ represents the first radio-frequency weighted matrix in the $(n+1)^{th}$ timeslot, $F_{RF,n+1}$ represents the second radio-frequency weighted matrix in the $(n+1)^{th}$ timeslot, and $H_{n+1}$ represents a transmission channel matrix between the communications device and the peer device in the $(n+1)^{th}$ timeslot.

S103. The communications device determines a digital weighted matrix of the communications device in the $(n+1)^{th}$ timeslot according to the equivalent channel matrix, so as to match a real-time channel and transmit data by using the real-time channel.

Specifically, after determining the equivalent channel matrix in the $(n+1)^{th}$ timeslot, the communications device may perform SVD (Singular value decomposition, singular value decomposition) on the equivalent channel matrix, and select the first $N_s$ columns of a left singular matrix as the digital weighted matrix of the communications device in the $(n+1)^{th}$ timeslot. $N_s$ is a quantity of data streams that are transmitted by a system at the same time.

Specific formulas are as follows:

$$SVD(H_{\mathit{eff},n+1}) = U_{n+1} \Lambda_{n+1} V_{n+1}^H; \text{ and}$$

$$W_{BB,n+1} = U_{n+1,:,1:N_s}, \text{ where}$$

$U_{n+1}$ is the left singular matrix of the equivalent channel matrix $H_{\mathit{eff},n+1}$, $W_{BB,n+1}$ is the digital weighted matrix of the communications device in the $(n+1)^{th}$ timeslot, $U_{n+1,:,1:N_s}$ is a matrix obtained by selecting the first $N_s$ columns of the matrix $U_{n+1}$, and $U_{n+1,:,1:N_s}$ is a conjugate transpose matrix of $U_{n+1,:,1:N_s}$.

The digital weighted matrix in the $(n+1)^{th}$ timeslot is determined by the communications device according to the equivalent channel matrix for which the channel relevance coefficient is considered. Therefore, the digital weighted matrix in the $(n+1)^{th}$ timeslot is relatively accurate, and can reflect channel real-time quality and match the real-time channel. In this case, when the communications device transmits data by using the real-time channel, a relatively high channel capacity can be obtained, and system spectrum efficiency can be improved.

This embodiment of the present application provides a beam tracking method. A communications device obtains a channel relevance coefficient, and determines a first radio-frequency weighted matrix of the communications device in an $(n+1)^{th}$ timeslot according to the relevance coefficient. That is, the first radio-frequency weighted matrix of the communications device in the $(n+1)^{th}$ timeslot is a matrix determined by the communications device after the communications device considers relevance between channels. The first radio-frequency weighted matrix that is of the communications device in the $(n+1)^{th}$ timeslot and that is determined by using the method has relatively high accuracy. After the communications device determines the first radio-frequency weighted matrix of the communications device in the $(n+1)^{th}$ timeslot, the communications device determines an equivalent channel matrix in the $(n+1)^{th}$ timeslot by using a received first known signal, and then determines a digital weighted matrix of the communications device in the $(n+1)^{th}$ timeslot according to the equivalent channel matrix.

Because the first known signal received by the communications device is sent by a peer device to the communications device according to a second radio-frequency weighted matrix of the peer device in the $(n+1)^{th}$ timeslot and the first radio-frequency weighted matrix of the communications device in the $(n+1)^{th}$ timeslot, both the digital weighted matrix of the communications device in the $(n+1)^{th}$ timeslot and the radio-frequency weighted matrix of the communications device in the $(n+1)^{th}$ timeslot that are determined by the communications device can reflect channel real-time quality and match a real-time channel. In this case, when the communications device transmits data in a high-frequency large-scale antenna system according to the digital weighted matrix and the radio-frequency weighted matrix, a relatively high channel capacity can be obtained, and system spectrum efficiency can be improved.

Embodiment 2

Figure 3:
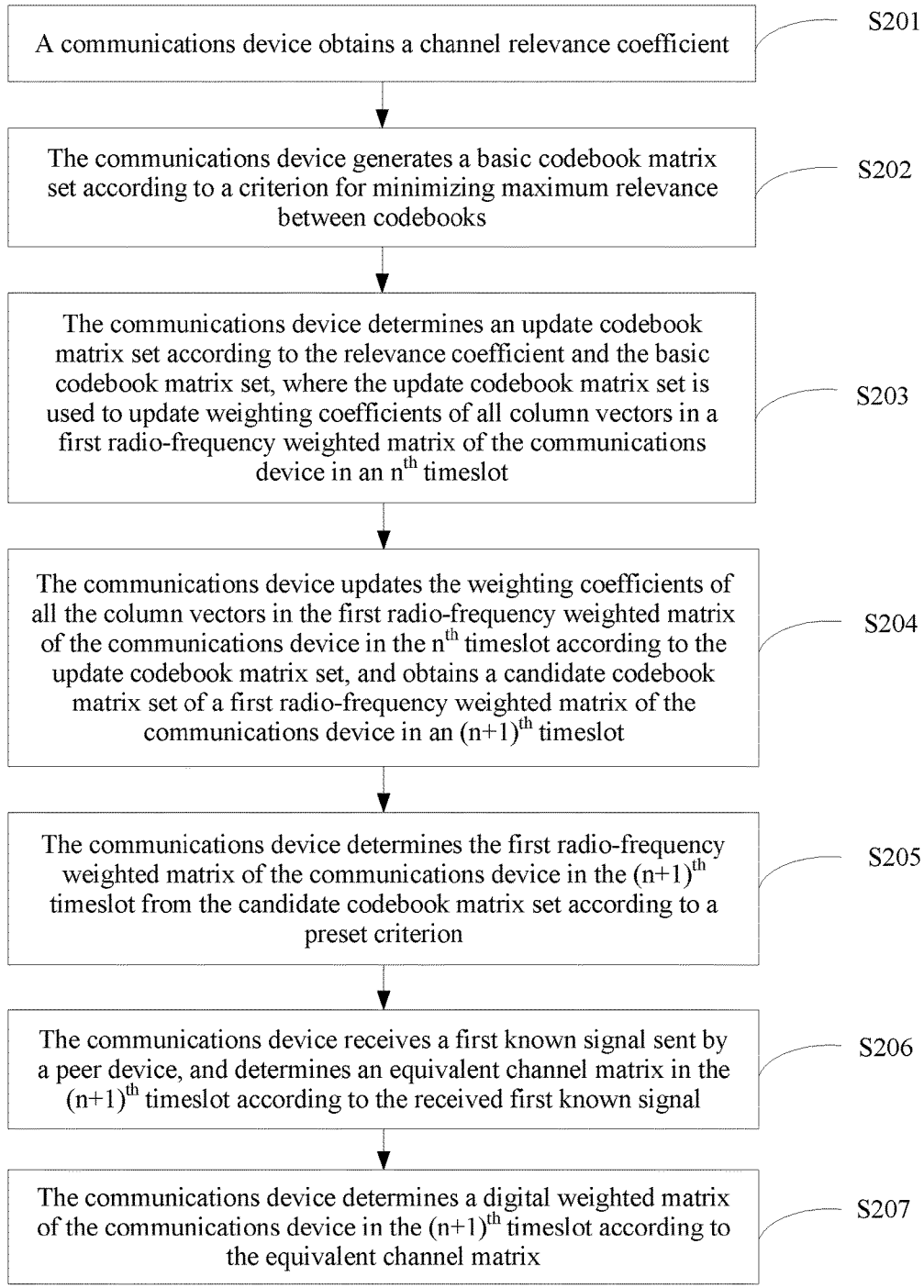
FIG. 3 is a schematic flowchart 2 of a beam tracking method according to an embodiment of the present application.

This embodiment of the present application provides a beam tracking method. As shown in FIG. 3, the method includes the following steps.

S201. A communications device obtains a channel relevance coefficient.

Time relevance between real-time channels basically exists in any communications system, and therefore, the communications device and a peer device need to consider the channel relevance coefficient when transmitting data.

For example, it is assumed that a channel between the communications device and the peer device in an $n^{th}$ timeslot is defined as follows:

$$H_n = \sqrt{\frac{N_t N_r}{L}} A_r(\theta_n) D_n A_t^H(\phi_n),$$

where $D_n = \operatorname{diag}([\alpha_{n,1}, \alpha_{n,2}, \ldots, \alpha_{n,L}]^T) \in C^{L \times L}$ represents a gain of a transmission path, $C^{L \times L}$ is an L×L dimensional complex number matrix, $\alpha_{n,i}$ represents a complex gain of an $i^{th}$ transmission path, $\alpha_{n,i} \cdot CN(0,1)$, for $i=1, \ldots, L$, L represents a total quantity of subpaths, CN(0,1) indicates that $\alpha_{n,i}$ meets complex Gaussian distribution, $N_t$ and $N_r$ respectively represent a quantity of antenna units of a transmit end and a quantity of antenna units of a receive end, and $\phi_n = [\phi_{n,1}, \phi_{n,2}, \ldots, \phi_{n,L}]^T \in R^{L \times 1}$ and $\theta_n = [\theta_{n,1}, \theta_{en,2}, \ldots, \theta_{n,L}]^T \in R^{L \times 1}$ respectively represent a direction of departure and a direction of arrival, $\phi_{n,i}, \theta_{n,i} \sim u(-\pi/2, \pi/2)$, that is, $\phi_{n,i}$ and $\theta_{n,i}$ meet even distribution of $(-\pi/2, \pi/2)$, and $A_t(\phi_n) \in C^{N_t \times L}$ and $A_r(\theta_n) \in C^{N_r \times L}$ respectively represent an array response matrix of the communications device and an array response matrix of the peer device and are defined as follows.

$$A_t(\phi_n) = \frac{1}{\sqrt{N_t}}[a_t(\phi_{n,1}), a_t(\phi_{n,2}), \ldots, a_t(\phi_{n,L})]$$

$$A_r(\theta_n) = \frac{1}{\sqrt{N_r}}[a_r(\theta_{n,1}), a_r(\theta_{n,2}), \ldots, a_r(\theta_{n,L})]$$

A ULA (uniform linear(arrays, uniform linear array) is used as an example, and for $i=1,2,\ldots,L$, $a_t(\phi_{n,i})$ and $a_r(\theta_{n,i})$ may be expressed as follows:

$$a_t(\phi_{n,i}) = \left[1, e^{j\frac{2\pi}{\lambda}d\sin(\phi_{n,i})}, \ldots, e^{j\frac{2\pi}{\lambda}(N_t-1)d\sin(\phi_{n,i})}\right]^T; \text{ and}$$

$$a_r(\theta_{n,i}) = \left[1, e^{j\frac{2\pi}{\lambda}d\sin(\theta_{n,i})}, \ldots, e^{j\frac{2\pi}{\lambda}(N_r-1)d\sin(\theta_{n,i})}\right]^T, \text{ where}$$

$\lambda$ represents a wavelength, and d represents a distance between adjacent antenna units.

Figure 4:
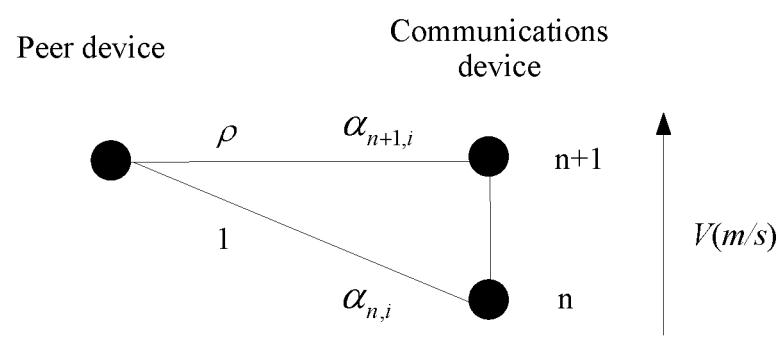
FIG. 4 is a schematic diagram of time relevance between adjacent transmission channels.

A geometric model of time relevance between two adjacent transmission channels is shown in FIG. 4. According to FIG. 4 and the foregoing formulas, it may be learned that a channel related to the $(n+1)^{th}$ timeslot is defined as follows:

$$H_{n+1} = \sqrt{\frac{N_t N_r}{L}} A_r(\theta_{n+1}) D_n A_t^H(\phi_{n+1});$$

where
$A_r(\theta_{n+1}) = A_{MS}(\theta_n + \Delta\theta_n)$, $\Delta\theta_n \in u[0, \arccos(\rho/2)]$, $A_t(\phi_{n+1}) = A_{BS}(\phi_n + \Delta\phi_n)$, $\Delta\phi_n \in u[0, \arccos(\rho)/2]$, $D_{n+1} = \rho D_n + \sqrt{1-\rho^2} Z_{n+1}$, $\rho \in [0,1]$ represents channel relevance between adjacent time blocks, $Z_{n+1} = \operatorname{diag}(z_{n+1,1}, \ldots, z_{n+1,L})$, $z_{n+1,i} \sim CN(0,1)$, and $Z_{n+1}$ and $D_n$ are mutually independent.

It may be directly learned from the formula that relevance exists between adjacent transmission channels.

Optionally, in this embodiment of the present application, the communications device may be a base station, or may be a terminal, and this is not limited in this embodiment of the present application.

Specifically, if the communications device is a terminal, the channel relevance coefficient may be determined by the terminal according to factors such as an environment in which the terminal is, a moving speed, and a multipath delay, or may be determined by the terminal by means of channel estimation or by using a known signal. This is not limited in this embodiment of the present application. If the communications device is a base station, the channel relevance coefficient may be sent by the peer device to the base station, or may be determined by the base station according to a received channel relevance parameter that is sent by the peer device to the base station and that includes information about the peer device such as a geographic location, a moving speed, and a multipath delay. This is not limited in this embodiment of the present application.

The peer device is a device that is configured relative to the communications device.

Specifically, if the communications device is a base station, the peer device may be a terminal; or if the communications device is a terminal, the peer device may be a base station.

For example, if the communications device is a terminal, the terminal may determine the channel relevance coefficient according to the following formula:

$\rho(\tau) = J_0(2\pi f_d \tau)$, where $f_d$ and $\tau$ respectively represent a Doppler shift and a multipath delay, and $J_0$ represents a zero-order Bessel function.

S202. The communications device generates a basic codebook matrix set according to a criterion for minimizing maximum relevance between codebooks.

Specifically, to wholly cover space by using a relatively small quantity of codebook matrices with a low repetition rate, the communications device generates the basic codebook matrix set according to the criterion for minimizing maximum relevance between codebooks. A codebook matrix in the basic codebook matrix set is randomly generated by the communications device, or may be generated by the communications device according to a specific rule.

For example, the basic codebook matrix set generated by the communications device is $\mathfrak{R} = \{R_1, R^2, \ldots, R_i, \ldots, R_N\}$. $R_i$ is an $i^{th}$ codebook matrix, and the basic codebook matrix set includes a total of N codebook matrices. Specifically, $R_i$ may be expressed as follows:

Alternatively, $R_i$ may be expressed as follows:

$$R_i = \begin{pmatrix} e^{j\theta_{i,1}} & & \\ & \ddots & \\ & & e^{j\theta_{i,N_{MS}}} \end{pmatrix},$$

where $$\theta_{i,j} \in \left\{ 0, \ldots, \frac{2(M-1)\pi}{M} \right\}.$$

The basic codebook matrix set $\mathfrak{R} = \{R_1, R_2, \ldots, R_i, \ldots, R_N\}$ generated by the communications device meets the criterion for minimizing maximum relevance between codebooks, that is, $$\mathfrak{R} = \operatorname{argmin}\left( \max_{\substack{1 \le i, j \le N \\ i \ne j}} |\operatorname{diag}(R_i)^H * \operatorname{diag}(R_j)|^2 \right),$$

where $(R_i)^H$ is a conjugate transpose matrix of $R_i$, $\operatorname{diag}(R_i)^H$ is a matrix obtained by selecting diagonal elements from the conjugate transpose matrix of $R_i$, and arg min(·) is an argument existing when a minimum value is being selected.

S203. The communications device determines an update codebook matrix set according to the relevance coefficient and the basic codebook matrix set, where the update codebook matrix set is used to update weighting coefficients of all column vectors in a first radio-frequency weighted matrix of the communications device in an $n^{th}$ timeslot.

In this embodiment of the present application, the update codebook matrix set is used to update the weighting coefficients of all the column vectors in the first radio-frequency weighted matrix of the communications device in the $n^{th}$ timeslot, and the channel relevance coefficient is introduced when the communications device determines the update codebook matrix set. In this case, a beam tracking range is narrowed, and beam tracking precision is increased.

For example, the update codebook matrix set determined by the communications device is $\vec{\Theta} = \{\Theta_1, \Theta_2, \ldots, \Theta_i, \ldots, \Theta_N\}$. $\Theta_i$ represents an $i^{th}$ update codebook matrix in the update codebook matrix set, and the update codebook matrix set includes a total of N update codebook matrices.

Specifically, when the communications device determines the update codebook matrix set, an intermediate matrix $\psi_i$ is first introduced. The intermediate matrix is expressed in a formula: $\psi_i = \varepsilon I + \sqrt{1-\varepsilon^2} R_i$, i=1, ..., N, and $\varepsilon = \alpha\rho$, $0 < \alpha < 1$. $\eta_i$ determined by the communications device based on channel relevance and the basic codebook matrix set is as follows:

$$\Theta_i = (\psi_i^H \psi_i)^{\frac{1}{2}} \psi_i, \, i = 1, \ldots, N,$$

where $\psi_i^H$ is a conjugate transpose matrix of $\psi_i$.

S204. The communications device updates the weighting coefficients of all the column vectors in the first radio-frequency weighted matrix of the communications device in the $n^{th}$ timeslot according to the update codebook matrix set, and obtains a candidate codebook matrix set of a first radio-frequency weighted matrix of the communications device in an $(n+1)^{th}$ timeslot.

Specifically, the communications device updates the weighting coefficients of all the column vectors in the first radio-frequency weighted matrix of the communications device in the $n^{th}$ timeslot in an order of columns according to the update codebook matrix set, and obtains each column of candidate weighted vector of the communications device in the $(n+1)^{th}$ timeslot. In this case, the candidate codebook matrix set of the first radio-frequency weighted matrix of the communications device in the $(n+1)^{th}$ timeslot includes each column of candidate weighted vector. When determining each column of candidate weighted vector of the communications device in the $(n+1)^{th}$ timeslot, the communications device needs to perform orthogonalization processing and matching hardware limitation processing.

For example, the communications device calculates a first column of candidate weighted vector $W_{RF,n+1,1,k}$ in the first radio-frequency weighted matrix of the communications device in the $(n+1)^{th}$ timeslot according to the update codebook matrix set $\Theta$ and by using the following formula:

$W_{RF,n+1,k} = \Theta_k \hat{W}_{RF,n,1}$, k=1, ..., N, where $\hat{W}_{RF,n,1}$ represents a first column of weighted vector in the first radio-frequency weighted matrix of the communications device in the $n^{th}$ timeslot.

Then, the communications device sequentially calculates the second to $N_{RFth}$ columns of candidate weighted vectors in the first radio-frequency weighted matrix.

Specifically, the communications device first calculates a $k^{th}$ column of candidate weighted vector $W_{RF,n+1,k,j}$, j=1 ..., N according to the method for calculating the first column of candidate weighted vector, and then obtains the $k^{th}$ column of candidate weighted vector in the first radio-frequency weighted matrix of the communications device in the $(n+1)^{th}$ timeslot after performing orthogonalization processing and matching hardware limitation processing.

The communications device may perform orthogonalization processing on the $k^{th}$ column of candidate weighted vector by using a Gram-Schmidt (Gram-Schmidt) orthogonalization method, and a specific formula is as follows:

$$\overline{W}_{RF,n+1,k} = \left( I_{N_r} - \sum_{i=1}^{k-1} \hat{W}_{RF,n+1,i} \hat{W}_{RF,n+1,i}^H \right) W_{RF,n+1,k},$$

where $I_{N_r}$ is an identity matrix, and $\hat{W}_{RF,n+1,i}$ is an $i^{th}$ column of weighted vectors in the first radio-frequency weighted matrix in the $(n+1)^{th}$ timeslot.

Specifically, if the communications device is a terminal, $I_{N_r}$ is $I_{N_{MS}}$; or if the communications device is a base station, $I_{N_r}$ is $I_{N_{BS}}$.

Then, the communications device performs matching hardware limitation processing on $\overline{W}_{RF,n+1,k}$. Specifically, the communications device introduces an $A_{can}$ matrix that meets hardware limitation, and selects, from the $A_{can}$ matrix, a column vector at a shortest distance from $\overline{W}_{RF,n+1,k}$ as the $k^{th}$ column of candidate weighted vector in the first radio-frequency weighted matrix of the communications device in the $(n+1)^{th}$ timeslot, so that each column of candidate weighted vector meets the hardware limitation.

$\overline{W}_{RF,n+1,k} = A_{can}(:,m^*)$, where $$m^* = \arg\min_{1 \leq j \leq N_{can}} \sqrt{1 - |\overline{W}_{RF,n+1,k}^H(:,i) A_{can}(:,j)|},$$

where $\overline{W}_{RF,n+1,k}^H(:,i)$ is an operation of selecting an $i^{th}$ column of the matrix $\overline{W}_{RF,n+1,k}^H$, and $A_{can}(:,j)$ an operation of selecting an $i^{th}$ column of the matrix can $A_{can}$.

S205. The communications device determines the first radio-frequency weighted matrix of the communications device in the $(n+1)^{th}$ timeslot from the candidate codebook matrix set according to a preset criterion.

The preset criterion in this embodiment of the present application may be a maximum receive power criterion, may be a minimum mean square error criterion, or may be a maximum signal-to-noise ratio criterion, and this is not limited in this embodiment of the present application.

Preferably, the preset criterion is the maximum receive power criterion.

Specifically, if the communications device is a terminal and the preset criterion is the maximum receive power criterion, after obtaining the candidate codebook matrix set of the first radio-frequency weighted matrix of the terminal in the $(n+1)^{th}$ timeslot, the terminal receives a second known signal sent by the base station, and calculates, according to the received second known signal, receive power that matches each candidate codebook matrix in the candidate codebook matrix set used by the terminal. In this case, the terminal may determine maximum receive power, and determine a candidate codebook matrix that matches the maximum receive power as the first radio-frequency weighted matrix of the terminal in the $(n+1)^{th}$ timeslot.

The second known signal in this embodiment of the present application is a preset signal, and a name of the second known signal is not limited in this embodiment of the present application.

For example, the terminal receives the second known signal, that is, a training signal, sent by the base station, and the signal received by the terminal may be expressed as follows:

$y(k) = W_{RF,n+1,i}(:,k) H_{n+1} F_{RF,n+1} \hat{s} + W_{RF,n+1,i}(:,k) \hat{n}$, where $W_{RF,n+1,i}(:,k)$ represents a $k^{th}$ candidate weighted vector of an $i^{th}$ column in the first radio-frequency weighted matrix of the terminal in the $(n+1)^{th}$ timeslot, $F_{RF,n+1}$ represents a second radio-frequency weighted matrix of the base station in the $(n+1)^{th}$ timeslot, $\hat{s}$ represents a training signal, $\hat{n}$ represents an additive white Gaussian noise in the timeslot, and $y(k)$ represents a received signal corresponding to a $k^{th}$ candidate codebook matrix used by the terminal.

The terminal determines each column of weighted vector in the first radio-frequency weighted matrix of the terminal in the $(n+1)^{th}$ timeslot according to calculated $y(k)$, and then determines the first radio-frequency weighted matrix of the terminal in the $(n+1)^{th}$ timeslot. The terminal may determine each column of weighted vector in the first radio-frequency weighted matrix of the terminal in the $(n+1)^{th}$ timeslot by using the following formula:

$$m_i^* = \arg\max_{1 \leq m \leq N} (|y(m)|).$$

$m_i^*$ is a sequence number of a candidate codebook corresponding to a weighted vector of the $i^{th}$ column in the first radio-frequency weighted matrix of the terminal in the $(n+1)^{th}$ timeslot.

If the communications device is a base station and the preset criterion is the maximum receive power criterion, after obtaining the candidate codebook matrix set of the first radio-frequency weighted matrix of the base station in the $(n+1)^{th}$ timeslot, the base station sends a second known signal to the peer device, so that the peer device calculates, according to the second known signal, receive power of each candidate codebook matrix in the candidate codebook matrix set used by the base station, and determines a sequence number of a candidate codebook matrix that matches maximum receive power. In this case, the base station may receive the sequence number sent by the peer device, and determine the candidate codebook matrix that matches the sequence number as the first radio-frequency weighted matrix of the base station in the $(n+1)^{th}$ timeslot.

S206. The communications device receives a first known signal sent by a peer device, and determines an equivalent channel matrix in the $(n+1)^{th}$ timeslot according to the received first known signal.

Specifically, after determining the first radio-frequency weighted matrix of the communications device in the $(n+1)^{th}$ timeslot according to the relevance coefficient, the communications device may receive the first known signal sent by the peer device, and determine the equivalent channel matrix in the $(n+1)^{th}$ timeslot according to the received first known signal. In this case, the first known signal received by the communications device is sent by the peer device to the communications device according to the second radio-frequency weighted matrix of the peer device in the $(n+1)^{th}$ timeslot and the first radio-frequency weighted matrix of the communications device in the $(n+1)^{th}$ timeslot.

The first known signal is a preset signal, the first known signal is a signal that is known to both the communications device and the peer device, and a name of the first known signal is not limited in this embodiment of the present application. For example, the first known signal is a sounding signal.

It may be understood that, the first known signal received by the communications device is a signal that passes through an adjusted channel between the communications device and the peer device, that is, a known signal sent by the peer device to the communications device according to the second radio-frequency weighted matrix of the peer device in the $(n+1)^{th}$ timeslot and the first radio-frequency weighted matrix of the communications device in the $(n+1)^{th}$ timeslot, and the communications device can obtain the first known signal sent by the peer device. In this case, the communications device may determine the equivalent channel matrix in the $(n+1)^{th}$ timeslot by means of calculation according to the received first known signal and the first known signal sent by the peer device.

In an actual application, the following formula may be used to specifically represent the equivalent channel matrix in the $(n+1)^{th}$ timeslot:

$$H_{eff,n+1} = W_{RF,n+1} H_{n+1} F_{RF,n+1}, \text{ where}$$

$H_{eff,n+1}$ represents the equivalent channel matrix between the communications device and the peer device in the $(n+1)^{th}$ timeslot, $W_{RF,n+1}$ represents the first radio-frequency weighted matrix of the communications device in the $(n+1)^{th}$ timeslot, $F_{RF,n+1}$ represents the second radio-frequency weighted matrix of the peer device in the $(n+1)^{th}$ timeslot, and $H_{n+1}$ represents a transmission channel matrix between the communications device and the peer device in the $(n+1)^{th}$ timeslot.

S207. The communications device determines a digital weighted matrix of the communications device in the $(n+1)^{th}$ timeslot according to the equivalent channel matrix.

Specifically, after determining the equivalent channel matrix in the $(n+1)^{th}$ timeslot, the communications device may perform SVD (singular value decomposition) on the equivalent channel matrix, and select the first $N_s$ columns of a left singular matrix as the digital weighted matrix of the communications device in the $(n+1)^{th}$ timeslot. $N_s$ is a quantity of data streams that are transmitted by a system at the same time.

Specific formulas are as follows:

$$SVD(H_{eff,n+1}) = U_{n+1} \Lambda_{n+1} V_{n+1}^H; \text{ and}$$

$$W_{BB,n+1} = U_{n+1,:,1:N_s}, \text{ where}$$

$U_{n+1}$ is the left singular matrix of the equivalent channel matrix $H_{eff,n+1}$, $W_{BB,n+1}$ is the digital weighted matrix of the communications device in the $(n+1)^{th}$ timeslot, $U_{n+1,:,1:N_s}$ is a matrix obtained by selecting the first $U_{n+1}$ columns of the matrix $N_s$, and $U_{n+1,:,1:N_s}^H$ is a conjugate transpose matrix of $U_{n+1,:,1:N_s}$.

The digital weighted matrix in the $(n+1)^{th}$ timeslot is determined by the communications device according to the equivalent channel matrix for which the channel relevance coefficient is considered. Therefore, the digital weighted matrix in the $(n+1)^{th}$ timeslot is relatively accurate, and can reflect channel real-time quality and match the real-time channel. In this case, when the communications device transmits data by using the real-time channel, a relatively high channel capacity can be obtained, and system spectrum efficiency can be improved.

This embodiment of the present application provides a beam tracking method. A communications device obtains a channel relevance coefficient, and determines a first radio-frequency weighted matrix of the communications device in an $(n+1)^{th}$ timeslot according to the relevance coefficient. That is, the first radio-frequency weighted matrix of the communications device in the $(n+1)^{th}$ timeslot is a matrix determined by the communications device after the communications device considers relevance between channels. The first radio-frequency weighted matrix that is of the communications device in the $(n+1)^{th}$ timeslot and that is determined by using the method has relatively high accuracy. After the communications device determines the first radio-frequency weighted matrix of the communications device in the $(n+1)^{th}$ timeslot, the communications device determines an equivalent channel matrix in the $(n+1)^{th}$ timeslot by using a received first known signal, and then determines a digital weighted matrix of the communications device in the $(n+1)^{th}$ timeslot according to the equivalent channel matrix.

Because the first known signal received by the communications device is sent by a peer device to the communications device according to a second radio-frequency weighted matrix of the peer device in the $(n+1)^{th}$ timeslot and the first radio-frequency weighted matrix of the communications device in the $(n+1)^{th}$ timeslot, both the digital weighted matrix of the communications device in the $(n+1)^{th}$ timeslot and the radio-frequency weighted matrix of the communications device in the $(n+1)^{th}$ timeslot that are determined by the communications device can reflect channel real-time quality and match a real-time channel. In this case, when the communications device transmits data in a high-frequency large-scale antenna system according to the digital weighted matrix and the radio-frequency weighted matrix, a relatively high channel capacity can be obtained, and system spectrum efficiency can be improved.

Embodiment 3

In a beam tracking method described in this embodiment of the present application, for a combination of a communications device and a peer device, the communications device may be a base station, and the peer device may be a terminal; or the communications device may be a terminal, and the peer device may be a base station, and this is not limited in this embodiment of the present application. In this embodiment of the present application, an example in which the communications device is a terminal and the peer device is a base station is used to describe this specific embodiment of the present application. This embodiment of the present application is applicable to a communication scenario of high-frequency uplink and high-frequency downlink, and is also applicable to a communication scenario of high-frequency downlink and low-frequency uplink. In this embodiment of the present application, the communication scenario of high-frequency uplink and high-frequency downlink is used as an example to describe this specific embodiment of the present application.

Figure 5:
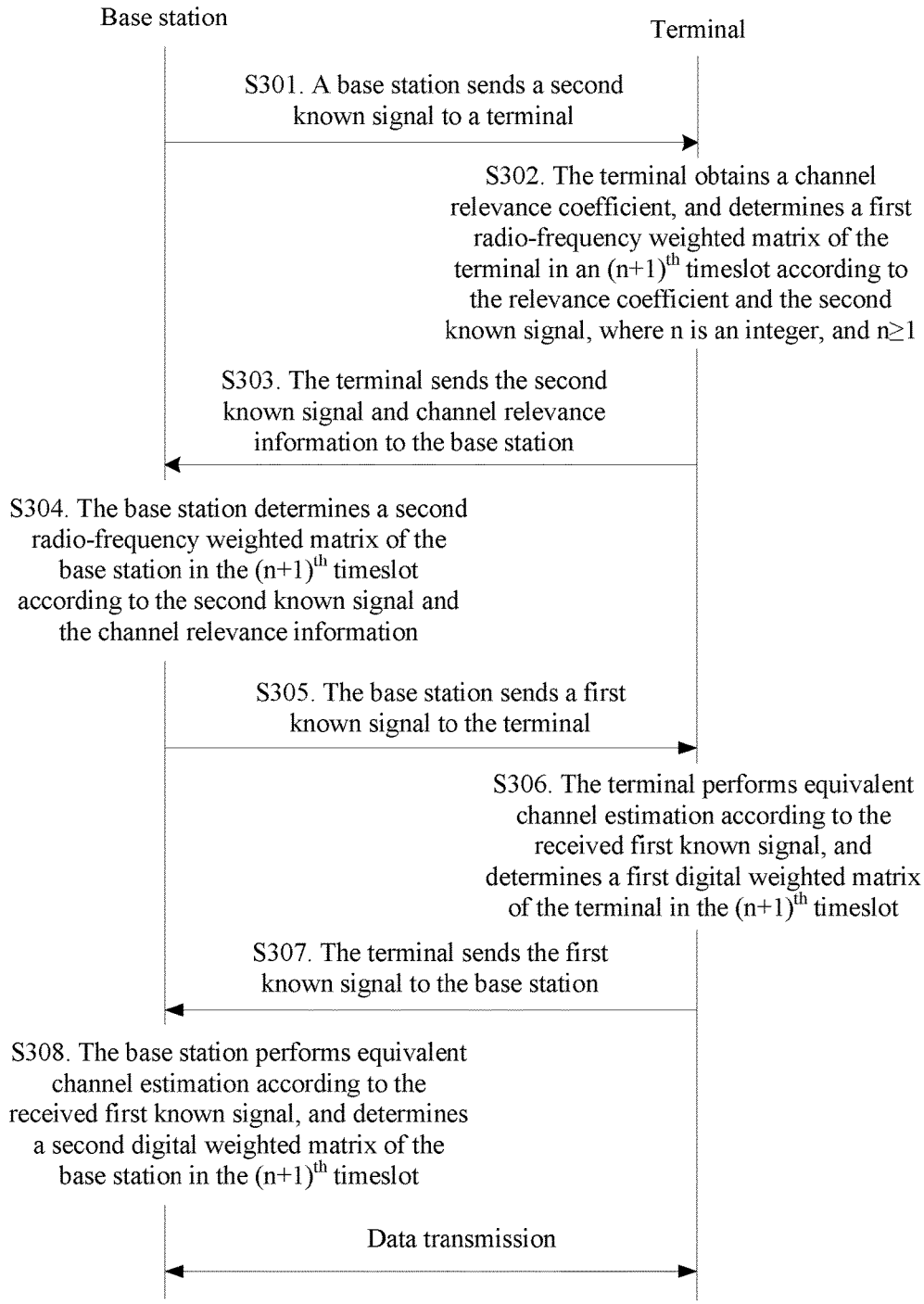
FIG. 5 is a schematic flowchart 3 of a beam tracking method according to an embodiment of the present application.

This embodiment of the present application provides the beam tracking method. As shown in FIG. 5, the method includes the following steps.

S301. The base station sends a second known signal to the terminal.

The second known signal in this embodiment of the present application is a preset signal, and the second known signal is a signal that is known to both the base station and the terminal. A name of the second known signal is not limited in this embodiment of the present application. For example, the second known signal is a training signal.

S302. The terminal obtains a channel relevance coefficient, and determines a first radio-frequency weighted matrix of the terminal in an $(n+1)^{th}$ timeslot according to the relevance coefficient and the second known signal, where n is an integer, and n≥1.

The terminal obtains the channel relevance coefficient in multiple manners, and the terminal may determine the channel relevance coefficient according to factors such as an environment in which the user transceiver is, a moving speed, and a multipath delay, or may determine the channel relevance coefficient by means of channel estimation or by using a known signal. This is not limited in this embodiment of the present application.

Specifically, after obtaining the relevance coefficient, the terminal generates a basic codebook matrix set according to a criterion for minimizing maximum relevance between codebooks, and then, the terminal determines an update codebook matrix set according to the obtained relevance coefficient and the generated basic codebook matrix set, so that the terminal updates weighting coefficients of all column vectors in a first radio-frequency weighted matrix of the terminal in an $n^{th}$ timeslot according to the update codebook matrix set, and obtains a candidate codebook matrix set of the first radio-frequency weighted matrix of the terminal in the $(n+1)^{th}$ timeslot. After obtaining the candidate codebook matrix set of the first radio-frequency weighted matrix of the terminal in the $(n+1)^{th}$ timeslot, the terminal calculates, according to the received second known signal, receive power that matches each candidate codebook matrix in the candidate codebook matrix set used by the terminal. In this case, the terminal may determine maximum receive power, and determine a candidate codebook matrix that matches the maximum receive power as the first radio-frequency weighted matrix of the terminal in the $(n+1)^{th}$ timeslot. For a specific calculation process, refer to Embodiment 2, and details are not described again in this embodiment of the present application.

S303. The terminal sends the second known signal and channel relevance information to the base station.

The terminal may directly send the channel relevance coefficient to the base station, or may send the channel relevance information that includes the factors such as the environment in which the terminal is, the moving speed, and the multipath delay.

S304. The base station determines a second radio-frequency weighted matrix of the base station in the $(n+1)^{th}$ timeslot according to the second known signal and the channel relevance information.

A method for determining the second radio-frequency weighted matrix of the base station in the $(n+1)^{th}$ timeslot by the base station is the same as the method for determining the first radio-frequency weighted matrix of the terminal in the $(n+1)^{th}$ timeslot by the terminal, and details are not described herein again.

S305. The base station sends a first known signal to the terminal.

After determining the respective radio-frequency weighted matrices in the $(n+1)^{th}$ timeslot, the base station and the terminal need to determine respective digital weighted matrices according to the respective radio-frequency weighted matrices.

Specifically, in order that the terminal determines the digital weighted matrix of the terminal, the base station sends the first known signal to the terminal, so that the terminal performs equivalent channel estimation according to the received first known signal, and then determines the digital weighted matrix of the terminal.

S306. The terminal performs equivalent channel estimation according to the received first known signal, and determines a first digital weighted matrix of the terminal in the $(n+1)^{th}$ timeslot.

The terminal performs equivalent channel estimation according to the received first known signal, obtains an equivalent channel matrix, performs SVD decomposition on the equivalent channel matrix, and determines the first digital weighted matrix of the terminal in the $(n+1)^{th}$ timeslot.

S307. The terminal sends the first known signal to the base station.

S308. The base station performs equivalent channel estimation according to the received first known signal, and determines a second digital weighted matrix of the base station in the $(n+1)^{th}$ timeslot.

After the base station and the terminal determine the respective digital weighted matrices in the $(n+1)^{th}$ timeslot, a channel between the base station and the terminal meets real-time quality, and data is transmitted between the base station and the terminal transmit data by using the real-time channel, so that a relatively high channel capacity can be obtained, and system spectrum efficiency can be improved.

This embodiment of the present application provides a beam tracking method. A communications device obtains a channel relevance coefficient, and determines a first radio-frequency weighted matrix of the communications device in an $(n+1)^{th}$ timeslot according to the relevance coefficient. That is, the first radio-frequency weighted matrix of the communications device in the $(n+1)^{th}$ timeslot is a matrix determined by the communications device after the communications device considers relevance between channels. The first radio-frequency weighted matrix that is of the communications device in the $(n+1)^{th}$ timeslot and that is determined by using the method has relatively high accuracy. After the communications device determines the first radio-frequency weighted matrix of the communications device in the $(n+1)^{th}$ timeslot, the communications device determines an equivalent channel matrix in the $(n+1)^{th}$ timeslot by using a received first known signal, and then determines a digital weighted matrix of the communications device in the $(n+1)^{th}$ timeslot according to the equivalent channel matrix.

Because the first known signal received by the communications device is sent by a peer device to the communications device according to a second radio-frequency weighted matrix of the peer device in the $(n+1)^{th}$ timeslot and the first radio-frequency weighted matrix of the communications device in the $(n+1)^{th}$ timeslot, both the digital weighted matrix of the communications device in the $(n+1)^{th}$ timeslot and the radio-frequency weighted matrix of the communications device in the $(n+1)^{th}$ timeslot that are determined by the communications device can reflect channel real-time quality and match a real-time channel. In this case, when the communications device transmits data in a high-frequency large-scale antenna system according to the digital weighted matrix and the radio-frequency weighted matrix, a relatively high channel capacity can be obtained, and system spectrum efficiency can be improved.

Embodiment 4

In a beam tracking method described in this embodiment of the present application, for a combination of a communications device and a peer device, the communications device may be a base station, and the peer device may be a terminal; or the communications device may be a terminal, and the peer device may be a base station, and this is not limited in this embodiment of the present application. In this embodiment of the present application, an example in which the communications device is a terminal and the peer device is a base station is used to describe this specific embodiment of the present application. This embodiment of the present application is applicable to a communication scenario of high-frequency uplink and high-frequency downlink, and is also applicable to a communication scenario of high-frequency downlink and low-frequency uplink. In this embodiment of the present application, the communication scenario of high-frequency downlink and low-frequency uplink is used as an example to describe this specific embodiment of the present application.

Figure 6:
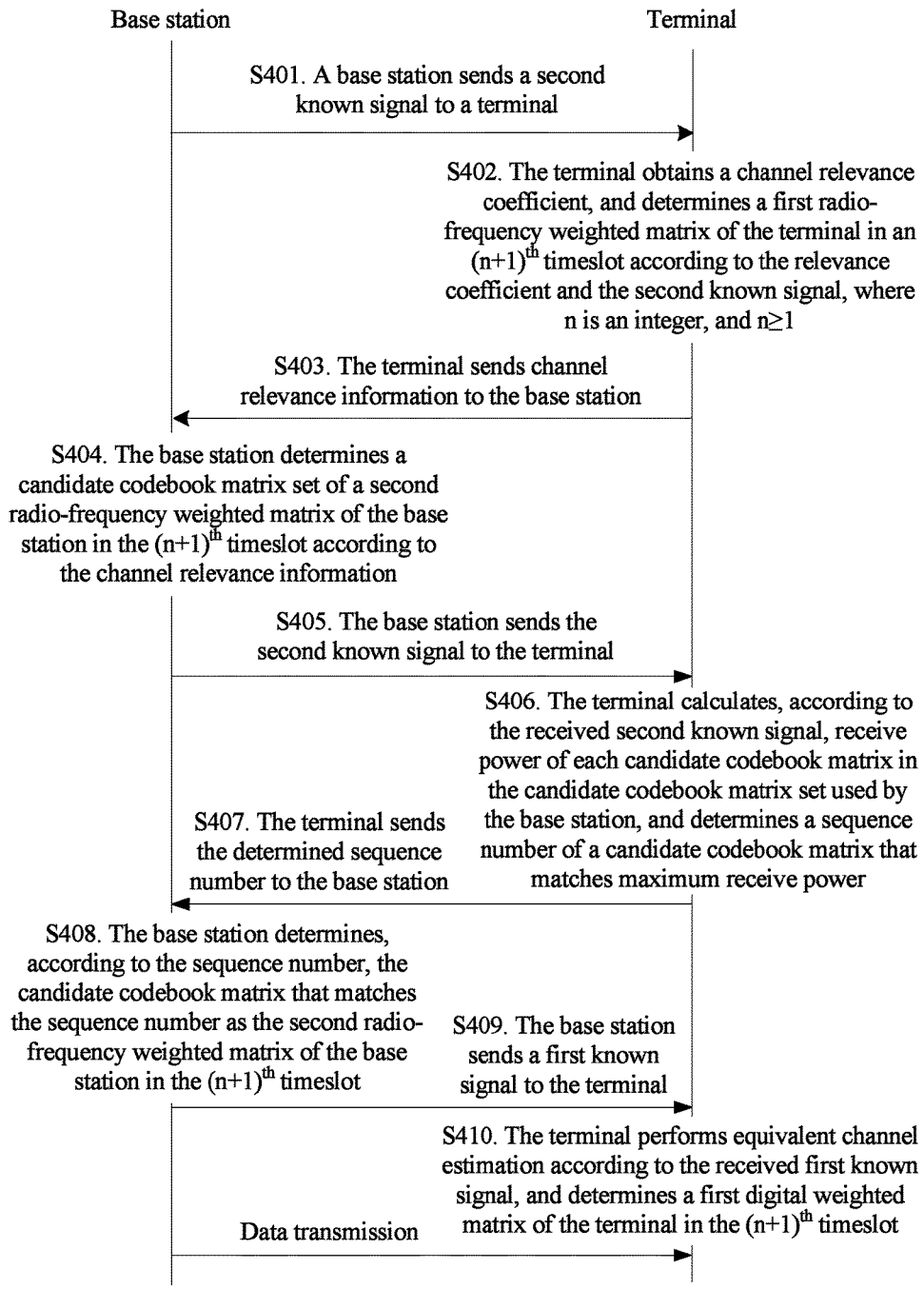
FIG. 6 is a schematic flowchart 4 of a beam tracking method according to an embodiment of the present application.

This embodiment of the present application provides the beam tracking method. As shown in FIG. 6, the method includes the following steps.

S401. The base station sends a second known signal to the terminal.

The second known signal in this embodiment of the present application is a preset signal, and the second known signal is a signal that is known to both the base station and the terminal. A name of the second known signal is not limited in this embodiment of the present application. For example, the second known signal is a training signal.

S402. The terminal obtains a channel relevance coefficient, and determines a first radio-frequency weighted matrix of the terminal in an $(n+1)^{th}$ timeslot according to the relevance coefficient and the second known signal, where n is an integer, and n≥1.

The terminal obtains the channel relevance coefficient in multiple manners, and the user transceiver may determine the channel relevance coefficient according to factors such as an environment in which the user transceiver is, a moving speed, and a multipath delay, or may determine the channel relevance coefficient by means of channel estimation or by using a known signal. This is not limited in this embodiment of the present application.

Specifically, after obtaining the relevance coefficient, the terminal generates a basic codebook matrix set according to a criterion for minimizing maximum relevance between codebooks, and then, the terminal determines an update codebook matrix set according to the obtained relevance coefficient and the generated basic codebook matrix set, so that the terminal updates weighting coefficients of all column vectors in a first radio-frequency weighted matrix of the terminal in an $n^{th}$ timeslot according to the update codebook matrix set, and obtains a candidate codebook matrix set of the first radio-frequency weighted matrix of the terminal in the $(n+1)^{th}$ timeslot. After obtaining the candidate codebook matrix set of the first radio-frequency weighted matrix of the terminal in the $(n+1)^{th}$ timeslot, the terminal calculates, according to the received second known signal, receive power that matches each candidate codebook matrix in the candidate codebook matrix set used by the terminal. In this case, the terminal may determine maximum receive power, and determine a candidate codebook matrix that matches the maximum receive power as the first radio-frequency weighted matrix of the terminal in the $(n+1)^{th}$ timeslot. For a specific calculation process, refer to Embodiment 2, and details are not described again in this embodiment of the present application.

S403. The terminal sends channel relevance information to the base station.

The terminal may directly send the channel relevance coefficient to the base station, or may send the channel relevance information that includes the factors such as the environment in which the terminal is, the moving speed, and the multipath delay.

S404. The base station determines a candidate codebook matrix set of a second radio-frequency weighted matrix of the base station in the $(n+1)^{th}$ timeslot according to the channel relevance information.

After determining the channel relevance coefficient according to the obtained relevance information, the base station generates a basic codebook matrix set according to the criterion for minimizing maximum relevance between codebooks, and then, the base station determines an update codebook matrix set according to the determined relevance coefficient and the generated basic codebook matrix set, so that the base station updates weighting coefficients of all column vectors in a second radio-frequency weighted matrix of the base station in the $n^{th}$ timeslot according to the update codebook matrix set, and obtains the candidate codebook matrix set of the second radio-frequency weighted matrix of the base station in the $(n+1)^{th}$ timeslot.

For a specific calculation process, refer to Embodiment 2, and detailed explanations are not provided again in this embodiment of the present application.

S405. The base station sends the second known signal to the terminal.

The communication scenario in this embodiment of the present application is the communication scenario of high-frequency downlink and low-frequency uplink. To obtain a high-frequency weighted matrix, the base station needs to send the second known signal to the terminal, so that the base station determines the radio-frequency weighted matrix of the base station.

S406. The terminal calculates, according to the received second known signal, receive power of each candidate codebook matrix in the candidate codebook matrix set used by the base station, and determines a sequence number of a candidate codebook matrix that matches maximum receive power.

Because the second known signal is a preset signal, after receiving the second known signal that is sent when the base station uses the candidate codebook matrices, the terminal may directly determine, according to receive power of the received second known signal, which candidate codebook matrix used by the base station is the most suitable for a real-time channel.

Specifically, after receiving the second known signal, the terminal searches for the maximum receive power of the second known signal, and records the sequence number of the candidate codebook that matches the maximum receive power. It should be noted that the terminal only needs to record the sequence number of the candidate codebook matrix that matches the maximum receive power without obtaining the candidate codebook matrix set of the second radio-frequency weighted matrix of the base station end in the $(n+1)^{th}$ timeslot.

S407. The terminal sends the determined sequence number to the base station.

S408. The base station determines, according to the sequence number, the candidate codebook matrix that matches the sequence number as the second radio-frequency weighted matrix of the base station in the $(n+1)^{th}$ timeslot.

Because the sequence number received by the base station is determined by the terminal according to the maximum receive power, the candidate codebook matrix corresponding to the sequence number is a codebook matrix with which the real-time channel can have a relatively high channel capacity and spectrum utilization can be high. Therefore, the base station directly determines, according to the received sequence number, the candidate codebook matrix that matches the received sequence number as the second radio-frequency weighted matrix in the $(n+1)^{th}$ timeslot.

S409. The base station sends a first known signal to the terminal.

S410. The terminal performs equivalent channel estimation according to the received first known signal, and determines a first digital weighted matrix of the terminal in the $(n+1)^{th}$ timeslot.

After both the second radio-frequency weighted matrix of the base station in the $(n+1)^{th}$ timeslot and the first radio-frequency weighted matrix of the terminal in the $(n+1)^{th}$ timeslot are determined, the terminal performs equivalent channel estimation according to the first known signal sent by the base station. In this case, an equivalent channel obtained by the terminal by means of estimation meets channel real-time quality, and the terminal can determine the first digital weighted matrix of the terminal in the $(n+1)^{th}$ timeslot according to the equivalent channel. In this case, when communication between the terminal and the base station is completed according to the first digital weighted matrix, a relatively high channel capacity can be obtained, and system spectrum efficiency can be improved.

This embodiment of the present application provides a beam tracking method. A communications device obtains a channel relevance coefficient, and determines a first radio-frequency weighted matrix of the communications device in an $(n+1)^{th}$ timeslot according to the relevance coefficient. That is, the first radio-frequency weighted matrix of the communications device in the $(n+1)^{th}$ timeslot is a matrix determined by the communications device after the communications device considers relevance between channels. The first radio-frequency weighted matrix that is of the communications device in the $(n+1)^{th}$ timeslot and that is determined by using the method has relatively high accuracy. After the communications device determines the first radio-frequency weighted matrix of the communications device in the $(n+1)^{th}$ timeslot, the communications device determines an equivalent channel matrix in the $(n+1)^{th}$ timeslot by using a received first known signal, and then determines a digital weighted matrix of the communications device in the $(n+1)^{th}$ timeslot according to the equivalent channel matrix.

Because the first known signal received by the communications device is sent by a peer device to the communications device according to a second radio-frequency weighted matrix of the peer device in the $(n+1)^{th}$ timeslot and the first radio-frequency weighted matrix of the communications device in the $(n+1)^{th}$ timeslot, both the digital weighted matrix of the communications device in the $(n+1)^{th}$ timeslot and the radio-frequency weighted matrix of the communications device in the $(n+1)^{th}$ timeslot that are determined by the communications device can reflect channel real-time quality and match a real-time channel. In this case, when the communications device transmits data in a high-frequency large-scale antenna system according to the digital weighted matrix and the radio-frequency weighted matrix, a relatively high channel capacity can be obtained, and system spectrum efficiency can be improved.

Embodiment 5

Figure 7:
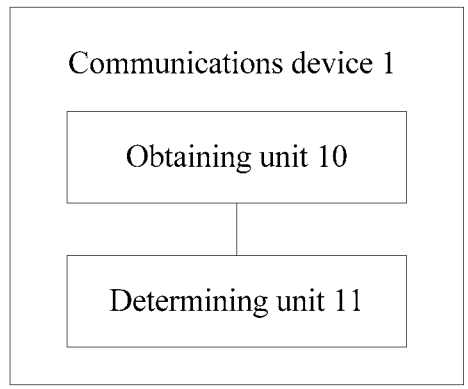
FIG. 7 is a schematic structural diagram 1 of a communications device according to an embodiment of the present application.

This embodiment of the present application provides a communications device 1. As shown in FIG. 7, the communications device 1 includes:

an obtaining unit 10, configured to: obtain a channel relevance coefficient; and receive a first known signal sent by a peer device, where the first known signal is sent by the peer device according to a second radio-frequency weighted matrix of the peer device in an $(n+1)^{th}$ timeslot and a first radio-frequency weighted matrix of the communications device 1 in an $(n+1)^{th}$ timeslot; and a determining unit 11, configured to: determine the first radio-frequency weighted matrix of the communications device in the $(n+1)^{th}$ timeslot according to the relevance coefficient obtained by the obtaining unit 10, where n is an integer, and n>1; determine an equivalent channel matrix in the $(n+1)^{th}$ timeslot according to the first known signal received by the obtaining unit 10; and determine a digital weighted matrix of the communications device in the $(n+1)^{th}$ timeslot according to the equivalent channel matrix, so as to match a real-time channel and transmit data by using the real-time channel.

Figure 8:
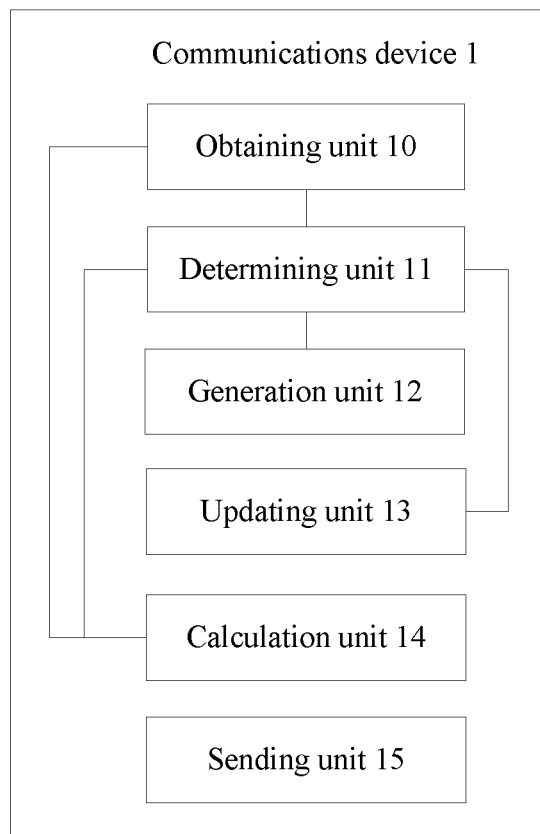
FIG. 8 is a schematic structural diagram 2 of a communications device according to an embodiment of the present application.

Further, as shown in FIG. 8, the communications device 1 includes a generation unit 12.

The generation unit 12 is configured to generate a basic codebook matrix set according to a criterion for minimizing maximum relevance between codebooks.

Further, the determining unit 11 is specifically configured to determine an update codebook matrix set according to the relevance coefficient obtained by the obtaining unit 10 and the basic codebook matrix set generated by the generation unit 12, where the update codebook matrix set is used to update weighting coefficients of all column vectors in a first radio-frequency weighted matrix of the communications device in an $n^{th}$ timeslot.

Further, as shown in FIG. 8, the communications device 1 includes an updating unit 13.

The updating unit 13 is configured to: update the weighting coefficients of all the column vectors in the first radio-frequency weighted matrix in the $n^{th}$ timeslot according to the update codebook matrix set determined by the determining unit 11, and obtain a candidate codebook matrix set of the first radio-frequency weighted matrix of the communications device in the $(n+1)^{th}$ timeslot.

Further, the determining unit 11 is specifically configured to determine, according to a preset criterion, the first radio-frequency weighted matrix of the communications device in the $(n+1)^{th}$ timeslot from the candidate codebook matrix set obtained by the updating unit 13.

Further, the obtaining unit 10 is configured to receive a second known signal sent by the peer device.

Further, as shown in FIG. 8, the communications device 1 includes a calculation unit 14.

The calculation unit 14 is configured to calculate, according to the second known signal received by the obtaining unit 10, receive power that matches each candidate codebook matrix in the candidate codebook matrix set used by the communications device.

Further, the determining unit 11 is specifically configured to: determine maximum receive power according to the receive power calculated by the calculation unit 14; and determine a candidate codebook matrix that matches the maximum receive power as the first radio-frequency weighted matrix of the communications device in the $(n+1)^{th}$ timeslot.

Further, the obtaining unit 10 is specifically configured to receive channel relevance information sent by the peer device.

Further, the determining unit 11 is specifically configured to determine the relevance coefficient according to the channel relevance information received by the obtaining unit 10.

Further, as shown in FIG. 8, the communications device 1 includes a sending unit 15.

The sending unit 15 is configured to send the second known signal to the peer device, so that the peer device calculates, according to the second known signal, the receive power of each candidate codebook matrix in the candidate codebook matrix set used by the communications device, and determines a sequence number of the candidate codebook matrix that matches the maximum receive power.

Further, the obtaining unit 10 is configured to receive the sequence number sent by the peer device.

Further, the determining unit 11 is configured to determine, according to the sequence number received by the obtaining unit 10, the candidate codebook matrix that matches the sequence number as the first radio-frequency weighted matrix of the communications device in the $(n+1)^{th}$ timeslot.

This embodiment of the present application provides a communications device, which mainly includes an obtaining unit and a determining unit. The communications device obtains a channel relevance coefficient, and determines a first radio-frequency weighted matrix of the communications device in an $(n+1)^{th}$ timeslot according to the relevance coefficient. That is, the first radio-frequency weighted matrix of the communications device in the $(n+1)^{th}$ timeslot is a matrix determined by the communications device after the communications device considers relevance between channels. The first radio-frequency weighted matrix that is of the communications device in the $(n+1)^{th}$ timeslot and that is determined by using the method has relatively high accuracy. After the communications device determines the first radio-frequency weighted matrix of the communications device in the $(n+1)^{th}$ timeslot, the communications device determines an equivalent channel matrix in the $(n+1)^{th}$ timeslot by using a received first known signal, and then determines a digital weighted matrix of the communications device in the $(n+1)^{th}$ timeslot according to the equivalent channel matrix.

Because the first known signal received by the communications device is sent by a peer device to the communications device according to a second radio-frequency weighted matrix of the peer device in the $(n+1)^{th}$ timeslot and the first radio-frequency weighted matrix of the communications device in the $(n+1)^{th}$ timeslot, both the digital weighted matrix of the communications device in the $(n+1)^{th}$ timeslot and the radio-frequency weighted matrix of the communications device in the $(n+1)^{th}$ timeslot that are determined by the communications device can reflect channel real-time quality and match a real-time channel. In this case, when the communications device transmits data in a high-frequency large-scale antenna system according to the digital weighted matrix and the radio-frequency weighted matrix, a relatively high channel capacity can be obtained, and system spectrum efficiency can be improved.

Embodiment 6

Figure 9:
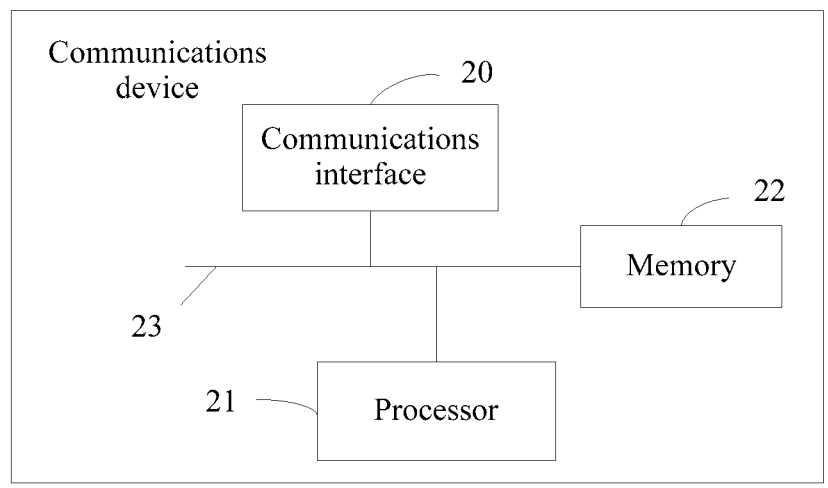
FIG. 9 is a schematic structural diagram 3 of a communications device according to an embodiment of the present application.

This embodiment of the present application provides a communications device. As shown in FIG. 9, the communications device may include a communications interface 20, a processor 21, a memory 22, and a system bus 23.

The communications interface 20, the processor 21, and the memory 22 are connected and complete mutual communication by using the system bus 23.

The processor 21 may be a single-core or multi-core central processing unit, or an application-specific integrated circuit, or one or more integrated circuits configured to implement this embodiment of the present application.

The memory 22 may be a high-speed RAM (Random Access Memory), or may be a non-volatile memory such as at least one magnetic disk memory. The memory 22 is configured to store a first radio-frequency weighted matrix in an $(n+1)^{th}$ timeslot and a digital weighted matrix in the $(n+1)^{th}$ timeslot that are determined by the communications device.

Optionally, the communications device provided in this embodiment of the present application may be a base station, or may be a terminal, and this is not limited in this embodiment of the present application.

Specifically, the communications interface 20 is configured to: obtain a channel relevance coefficient; and receive a first known signal sent by a peer device, where the first known signal is sent by the peer device according to a second radio-frequency weighted matrix of the peer device in an $(n+1)^{th}$ timeslot and a first radio-frequency weighted matrix of the communications device in the $(n+1)^{th}$ timeslot.

Specifically, the processor 21 is configured to: determine the first radio-frequency weighted matrix of the communications device in the $(n+1)^{th}$ timeslot according to the relevance coefficient obtained by the communications interface 20, where n is an integer, and n≥1; determine an equivalent channel matrix in the $(n+1)^{th}$ timeslot according to the first known signal received by the communications interface 20; and determine a digital weighted matrix of the communications device in the $(n+1)^{th}$ timeslot according to the equivalent channel matrix, so as to match a real-time channel and transmit data by using the real-time channel.

Further, the processor 21 is configured to: generate a basic codebook matrix set according to a criterion for minimizing maximum relevance between codebooks; determine an update codebook matrix set according to the relevance coefficient obtained by the communications interface 20 and the basic codebook matrix set, where the update codebook matrix set is used to update weighting coefficients of all column vectors in a first radio-frequency weighted matrix of the communications device in an $n^{th}$ timeslot; update the weighting coefficients of all the column vectors in the first radio-frequency weighted matrix in the $n^{th}$ timeslot according to the update codebook matrix set, and obtain a candidate codebook matrix set of the first radio-frequency weighted matrix of the communications device in the $(n+1)^{th}$ timeslot; and determine the first radio-frequency weighted matrix of the communications device in the $(n+1)^{th}$ timeslot from the candidate codebook matrix set according to a preset criterion.

Further, the communications interface 20 is configured to receive a second known signal sent by the peer device.

Further, the processor 21 is configured to: calculate, according to the second known signal received by the communications interface 20, receive power that matches each candidate codebook matrix in the candidate codebook matrix set used by the communications device; determine maximum receive power according to the receive power; and determine a candidate codebook matrix that matches the maximum receive power as the first radio-frequency weighted matrix of the communications device in the $(n+1)^{th}$ timeslot.

Further, the communications interface 20 is specifically configured to receive channel relevance information sent by the peer device.

Further, the processor 21 is specifically configured to determine the relevance coefficient according to the channel relevance information received by the communications interface 20.

Further, the communications interface 20 is configured to send the second known signal to the peer device, so that the peer device calculates, according to the second known signal, the receive power of each candidate codebook matrix in the candidate codebook matrix set used by the communications device, and determines a sequence number of the candidate codebook matrix that matches the maximum receive power.

Further, the communications interface 20 is configured to receive the sequence number sent by the peer device.

Further, the processor 21 is configured to determine, according to the sequence number received by the communications interface 20, the candidate codebook matrix that matches the sequence number as the first radio-frequency weighted matrix of the communications device in the $(n+1)^{th}$ timeslot.

This embodiment of the present application provides a communications device. The communications device obtains a channel relevance coefficient, and determines a first radio-frequency weighted matrix of the communications device in an $(n+1)^{th}$ timeslot according to the relevance coefficient. That is, the first radio-frequency weighted matrix of the communications device in the $(n+1)^{th}$ timeslot is a matrix determined by the communications device after the communications device considers relevance between channels. The first radio-frequency weighted matrix that is of the communications device in the $(n+1)^{th}$ timeslot and that is determined by using the method has relatively high accuracy. After the communications device determines the first radio-frequency weighted matrix of the communications device in the $(n+1)^{th}$ timeslot, the communications device determines an equivalent channel matrix in the $(n+1)^{th}$ timeslot by using a received first known signal, and then determines a digital weighted matrix of the communications device in the $(n+1)^{th}$ timeslot according to the equivalent channel matrix.

Because the first known signal received by the communications device is sent by a peer device to the communications device according to a second radio-frequency weighted matrix of the peer device in the $(n+1)^{th}$ timeslot and the first radio-frequency weighted matrix of the communications device in the $(n+1)^{th}$ timeslot, both the digital weighted matrix of the communications device in the $(n+1)^{th}$ timeslot and the radio-frequency weighted matrix of the communications device in the $(n+1)^{th}$ timeslot that are determined by the communications device can reflect channel real-time quality and match a real-time channel. In this case, when the communications device transmits data in a high-frequency large-scale antenna system according to the digital weighted matrix and the radio-frequency weighted matrix, a relatively high channel capacity can be obtained, and system spectrum efficiency can be improved.

Embodiment 7

Figure 10:
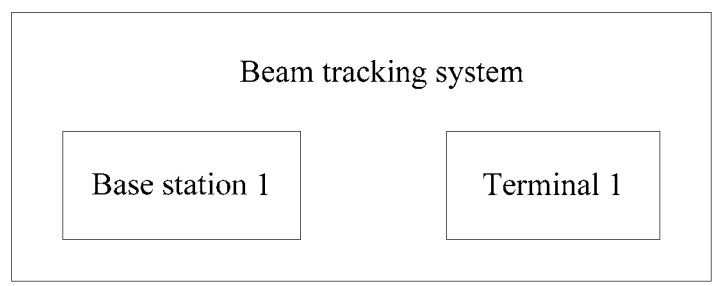
FIG. 10 is a schematic structural diagram of a beam tracking system according to an embodiment of the present application.

This embodiment of the present application provides a beam tracking system. As shown in FIG. 10, the system includes a base station 1 and a terminal 1, and the base station 1 communicates with the terminal 1 by using a communications system. The base station 1 or the terminal 1 or both include the communications device that has any one of features in Embodiment 6.

This embodiment of the present application provides a beam tracking system. A channel relevance coefficient is obtained, and a first radio-frequency weighted matrix of a communications device in an $(n+1)^{th}$ timeslot is determined according to the relevance coefficient. That is, the first radio-frequency weighted matrix of the communications device in the $(n+1)^{th}$ timeslot is a matrix determined by the communications device after the communications device considers relevance between channels. The first radio-frequency weighted matrix that is of the communications device in the $(n+1)^{th}$ timeslot and that is determined by using the method has relatively high accuracy. After determining the first radio-frequency weighted matrix of the communications device in the $(n+1)^{th}$ timeslot, the communications device determines an equivalent channel matrix in the $(n+1)^{th}$ timeslot by using a received first known signal, and then determines a digital weighted matrix of the communications device in the $(n+1)^{th}$ timeslot according to the equivalent channel matrix.

Because the first known signal received by the communications device is sent by a peer device to the communications device according to a second radio-frequency weighted matrix of the peer device in the $(n+1)^{th}$ timeslot and the first radio-frequency weighted matrix of the communications device in the $(n+1)^{th}$ timeslot, both the digital weighted matrix of the communications device in the $(n+1)^{th}$ timeslot and the radio-frequency weighted matrix of the communications device in the $(n+1)^{th}$ timeslot that are determined by the communications device can reflect channel real-time quality and match a real-time channel. In this case, when the communications device transmits data in a high-frequency large-scale antenna system according to the digital weighted matrix and the radio-frequency weighted matrix, a relatively high channel capacity can be obtained, and system spectrum efficiency can be improved.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes instructions for instructing a computer device (which may be a personal computer, a server, or a network device) or a processor to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A beam tracking method comprising:

obtaining, by a communications device, a channel relevance coefficient, and determining a first radio-frequency weighted matrix of the communications device in an (n+1)th timeslot according to the channel relevance coefficient, wherein n is an integer, and n≥1;

receiving, by the communications device, a first known signal sent by a peer device, and determining an equivalent channel matrix in the (n+1)th timeslot according to the received first known signal, wherein the first known signal is sent by the peer device to the communications device according to a second radio-frequency weighted matrix of the peer device in the (n+1)th timeslot and the first radio-frequency weighted matrix of the communications device in the (n+1)th timeslot; and determining, by the communications device, a digital weighted matrix of the communications device in the (n+1)th timeslot according to the equivalent channel matrix, so as to match a real-time channel and transmit data by using the real-time channel;

wherein the obtaining, by the communications device, the channel relevance coefficient, and determining the first radio-frequency weighted matrix of the communications device in the (n+1)th timeslot according to the channel relevance coefficient comprises:

obtaining, by the communications device, the channel relevance coefficient;

generating, by the communications device, a basic codebook matrix set according to a criterion for minimizing maximum relevance between codebooks;

determining, by the communications device, an update codebook matrix set according to the channel relevance coefficient and the basic codebook matrix set, wherein the update codebook matrix set is used to update weighting coefficients of all column vectors in a first radio-frequency weighted matrix of the communications device in an nth timeslot;

updating, by the communications device, the weighting coefficients of all the column vectors in the first radio-frequency weighted matrix in the nth timeslot according to the update codebook matrix set, and obtaining a candidate codebook matrix set of the first radio-frequency weighted matrix of the communications device in the (n+1)th timeslot; and determining, by the communications device, the first radio-frequency weighted matrix of the communications device in the (n+1)th timeslot from the candidate codebook matrix set according to a preset criterion.

2. The beam tracking method according to claim 1, wherein the determining, by the communications device, the first radio-frequency weighted matrix of the communications device in the $(n+1)^{th}$ timeslot from the candidate codebook matrix set according to the preset criterion comprises:

receiving, by the communications device, a second known signal sent by the peer device;

calculating, by the communications device according to the second known signal, receive power that matches each candidate codebook matrix in the candidate codebook matrix set used by the communications device, and determining maximum receive power; and determining, by the communications device, a candidate codebook matrix that matches the maximum receive power as the first radio-frequency weighted matrix of the communications device in the $(n+1)^{th}$ timeslot.

3. The beam tracking method according to claim 2, wherein before the determining, by the communications device, the first radio-frequency weighted matrix of the communications device in the $(n+1)^{th}$ timeslot from the candidate codebook matrix set according to the preset criterion, the method further comprises:

sending, by the communications device, the second known signal to the peer device, so that the peer device calculates, according to the second known signal, the receive power that matches each candidate codebook matrix in the candidate codebook matrix set used by the communications device, and determines a sequence number of the candidate codebook matrix that matches the maximum receive power.

4. The beam tracking method according to claim 3, wherein the determining, by the communications device, the first radio-frequency weighted matrix of the communications device in the $(n+1)^{th}$ timeslot from the candidate codebook matrix set according to the preset criterion comprises:

receiving, by the communications device, the sequence number sent by the peer device; and determining, by the communications device according to the sequence number, the candidate codebook matrix that matches the sequence number as the first radio-frequency weighted matrix of the communications device in the $(n+1)^{th}$ timeslot.

5. The beam tracking method according to claim 1, wherein the obtaining, by the communications device, the channel relevance coefficient comprises:

receiving, by the communications device, channel relevance information sent by the peer device, and determining the channel relevance coefficient according to the channel relevance information.

6. A communications device comprising a communications interface, a processor and a memory connected by using a system bus, wherein:

the communications interface circuit is configured to:

obtain a channel relevance coefficient; and receive a first known signal sent by a peer device, wherein the first known signal is sent by the peer device according to a second radio-frequency weighted matrix of the peer device in an (n+1)th timeslot and a first radio-frequency weighted matrix of the communications device in the (n+1)th timeslot; and the processor is configured to:
　　determine the first radio-frequency weighted matrix of the communications device in the (n+1)th timeslot according to the channel relevance coefficient obtained by the communications interface, wherein n is an integer, and n≥1;
　　determine an equivalent channel matrix in the (n+1)th timeslot according to the first known signal received by the communications interface;
　　determine a digital weighted matrix of the communications device in the (n+1)th timeslot according to the equivalent channel matrix, so as to match a real-time channel and transmit data by using the real-time channel;
　　generate a basic codebook matrix set according to a criterion for minimizing maximum relevance between codebooks;
　　determine an update codebook matrix set according to the channel relevance coefficient obtained by the communications interface and the basic codebook matrix set, wherein the update codebook matrix set is used to update weighting coefficients of all column vectors in a first radio-frequency weighted matrix of the communications device in an nth timeslot;
　　update the weighting coefficients of all the column vectors in the first radio-frequency weighted matrix in the nth timeslot according to the update codebook matrix set;
　　obtain a candidate codebook matrix set of the first radio-frequency weighted matrix of the communications device in the (n+1)th timeslot; and
　　determine the first radio-frequency weighted matrix of the communications device in the (n+1)th timeslot from the candidate codebook matrix set according to a preset criterion.

7. The communications device according to claim 6, wherein:
　　the communications interface circuit is further configured to:
　　　　receive a second known signal sent by the peer device; and
　　the processor is further configured to:
　　　　calculate, according to the second known signal received by the communications interface, receive power that matches each candidate codebook matrix in the candidate codebook matrix set used by the communications device; and
　　　　determine maximum receive power according to the receive power; and determine a candidate codebook matrix that matches the maximum receive power as the first radio-frequency weighted matrix of the communications device in the (n+1)th timeslot.

8. The communications device according to claim 7, wherein
　　the communications interface circuit is further configured to:
　　　　send the second known signal to the peer device, so that the peer device calculates, according to the second known signal, the receive power of each candidate codebook matrix in the candidate codebook matrix set used by the communications device, and
　　　　determine a sequence number of the candidate codebook matrix that matches the maximum receive power.

9. The communications device according to claim 8, wherein:
　　the communications interface circuit is further configured to:
　　　　receive the sequence number sent by the peer device; and
　　the processor is further configured to:
　　　　determine, according to the sequence number received by the communications interface, the candidate codebook matrix that matches the sequence number as the first radio-frequency weighted matrix of the communications device in the (n+1)th timeslot.

10. The communications device according to claim 6, wherein
　　the communications interface circuit is further configured to:
　　　　receive channel relevance information sent by the peer device; and
　　the processor is further configured to:
　　　　determine the channel relevance coefficient according to the channel relevance information received by the communications interface.

\* \* \* \* \*